April 23, 1957  K. A. KLINGLER  2,789,845
JOURNAL BOX SEAL

Filed June 10, 1953  2 Sheets-Sheet 1

Inventor
Karl A. Klingler
by Parker & Carter
Attorneys

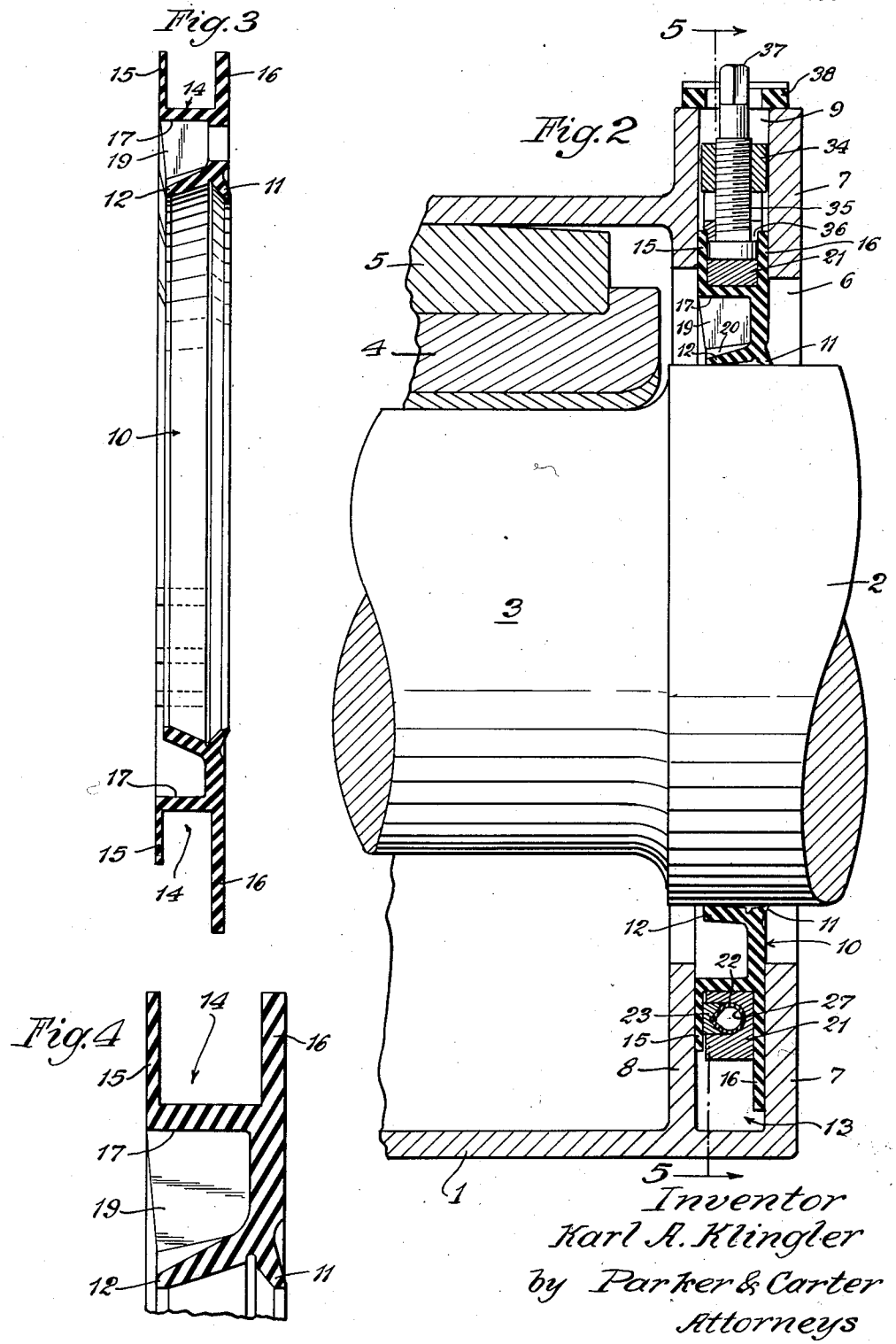

United States Patent Office 2,789,845
Patented Apr. 23, 1957

2,789,845

JOURNAL BOX SEAL

Karl A. Klingler, Naperville, Ill.

Application June 10, 1953, Serial No. 360,742

2 Claims. (Cl. 286—6)

My invention relates to improvements in seals for the inboard end of railroad car journal boxes and has for one object to provide means whereby a sealing member may be adjusted to fit a wide range of sizes and shapes of journal boxes.

Another object of my invention is to provide an expansible means whereby the application of pressure at a single point in a journal box seal may expand it over a wide area to fit a wide range of journal boxes.

I propose to provide on the inboard end of a typical railroad journal box a rubber or rubber-like seal which will encircle and engage throughout its entire periphery a railroad axle. This seal will be contained about the aperture in the inner end wall of the journal box and will be so mounted in a pocket in that wall that it makes a tight contact with it.

One important element of my invention involves means whereby the seal, after assembly of the journal box, the brasses and the journal, may be positioned encircling the axle so that the elements of the seal or parts thereof may thereafter be expanded to grip the journal box wall and hold the seal in proper position, such expansion in no wise changing the relationship between the journal box, the seal and the railroad axle from what it was before such expansion takes place.

The element bringing about this expansion involves a flexible walled hose or pipe-like container of rubber-like material completely filled with an incompressible hydraulic fluid together with a housing for such expansible member so arranged that when pressure is applied to any part of the expanding member, pressure will be hydraulically transmitted throughout its entire area to expand the seal.

Preferably pressure will be applied to one end or both ends of the expansible member and may well take the form of a plunger which enters the expansible member and so-to-speak turns part of it inside out, thus applying the hydraulic pressure.

Other objects will appear from time to time throughout the specification and claims.

Figure 2 is a section along the line 2—2 of Figure 1;

Figure 3 is a detail section through the rubber sealing ring alone;

Figure 4 is a detail section similar to Figure 3 on an enlarged scale.

Like parts are indicated by like characters throughout the specification and drawings.

Figure 1:
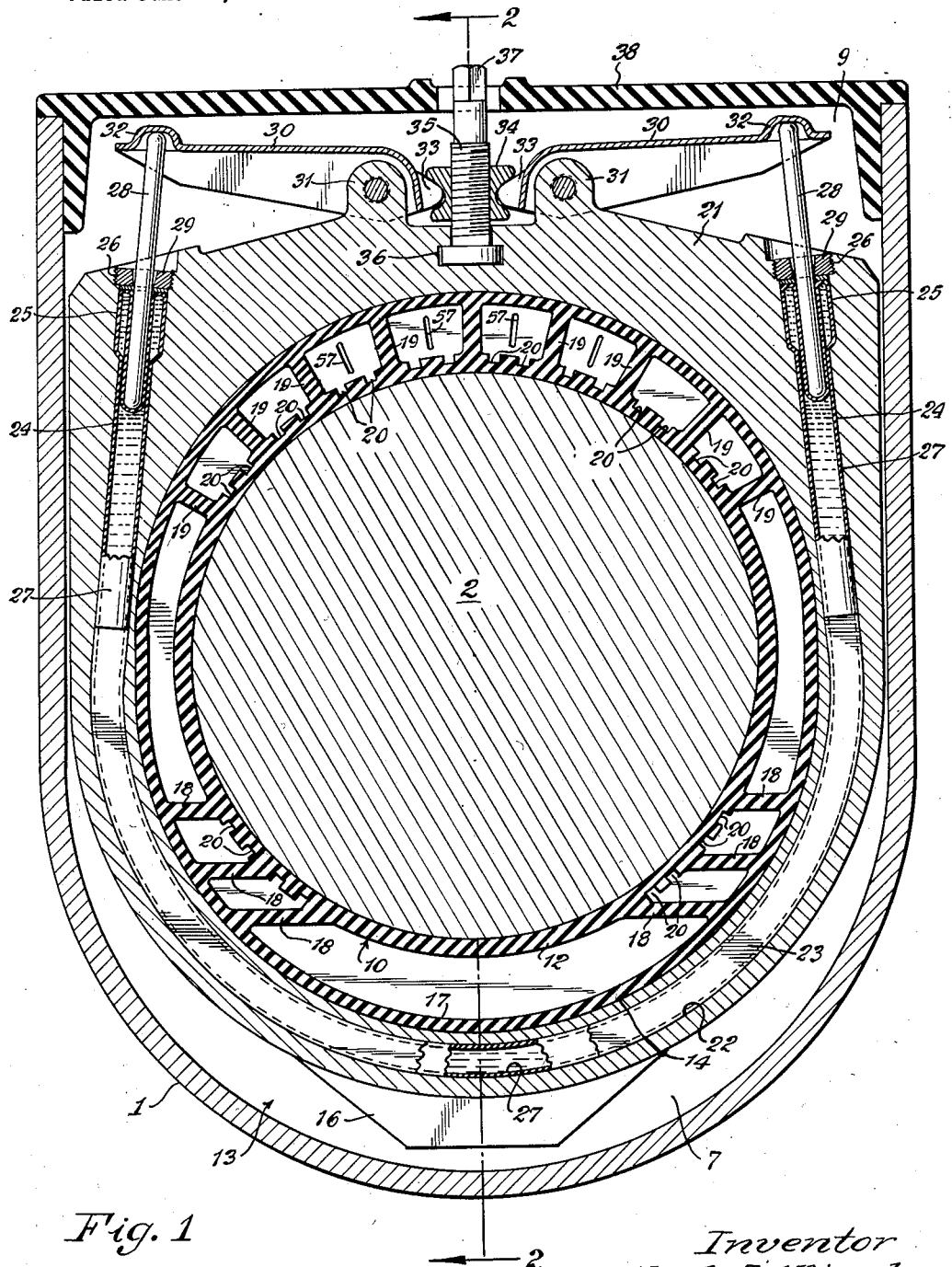
Figure 1 is a section through the gasket and journal box in a plane perpendicular to the journal.

1 is the journal box; 2 the railroad car axle; 3 the journal; 4 the brass and 5 the wedge. The journal box is apertured at the inboard end at 6 to permit entrance of the axle. Encircling the aperture 6 and integral with the body of the journal box is an outer wall 7 and an inner wall 8 spaced apart longitudinally of the axle and forming a chamber or pocket open at the top of the journal box as at 9.

10 is a sealing ring of rubber or elastomeric material, apertured to engage the axle, the diameter of the aperture in the ring before it is expanded being enough less than the diameter of the axle to insure that when the ring encircles the axle the two inclined flanges 11 and 12 will both snugly engage the axle even though axles themselves sometimes vary somewhat in radius. This ring 10 is enclosed within the pocket 13 between the walls 7 and 8. The ring is annularly grooved as at 14 and the groove is defined by opposed ring flanges 15, 16. The flange 16 extends somewhat further out from the center of the ring at bottom and sides of the journal box but at the top the flanges 15 and 16 are at generally the same distance from the axis of the journal.

The cylindrical portion 17 of the ring 10 is supported from the flange 12 by a plurality of generally horizontal ribs 18 below the axis of the axle and above the axis of the axle is reinforced by a series of radial ribs 19. The inner wall of the flange 12 is notched between the ribs as at 20.

The purpose of the notches 20 is to permit the flange 12 to expand and contract to fit snugly without undue pressure upon axles of varying size.

The weight of the car is applied by the brass 4 and the wedge 5 to the journal 3 and that limits the upward movement of the journal in the box. Under traveling conditions, it frequently happens that as the car travels along the track, irregularities cause a relative rise and fall of the journal with respect to the brass. In other words, the journal 3 may drop down away from the brass but once it contacts the brass it can go no further up. It is to permit such downward movement of the axle and stretching of the sealing ring that the ribs 18 below the axis of the journal are horizontal because, as will hereinafter appear, the sealing ring is locked in place in the journal box but the axle must be free to move in the journal box, and so since the sealing ring snugly encircles the axle at all times, there must be a provision for up and down movement of the flange 12 which encircles the axle and must move with the axle without breaking the connection between that flange and the remainder of the ring fixed in place in the journal box.

Element 21 is a metal reinforcing and flange clamping ring. It is centrally apertured to encircle the sealing ring 10 with the inner generally annular cylindrical portion of the ring in engagement with the periphery of the aperture and with the two flanges 15, 16 on opposite sides. The relation between the reinforcing ring and the rubber seal is well shown in the section of Figure 2. The metal reinforcing ring has in one face thereof the curved channel 22. This channel extends generally a little more than half way around the axle so that the two ends thereof are above the normal position of the central axis and journal. 23 is a curved expander segment located within the groove or channel 22 and movable in and out of that channel along a path parallel with the axis of the journal. 24 are bore holes in the reinforcing ring 21 in prolongation of the channel 22. Each bore hole at its upper end is enlarged as at 25 and interiorly threaded as at 26 and open at the top of the ring 21. 27 is a rubber or rubber-like tube closed at both ends and contained in the bore holes 24 and the channel or groove 22 beneath the expander segment 23. This tube 27 is completely filled with a hydraulic liquid so that if pressure is applied to the hydraulic liquid in the ends of the tube, the tube will expand in the area beneath the segment 23 and force that segment outwardly, thus exerting pressure on the flanges 15, 16 to force them against the walls 7 and 8 and firmly grip the outer periphery of the sealing ring in place in the channel box.

This pressure may be provided as shown in Figure 1 by plungers 28 which penetrate the threaded annular rings 29 and engage the ends of the tube 27, the rings 29 serving the dual purpose of guiding the plungers 28 and holding the rings in place. The expanded portion 25 permits radial expansion of a portion of the tube at each end so as to avoid binding at the point where the tube end turns inwardly.

Levers 30 are pivoted on ears 31 at the top of the reinforcing ring 21. They are pocketed at 32 to engage the outer ends of the plungers 28. The lugs 33 at the inner ends of the levers engage the follower block 34 in threaded relationship with a screw 35, the head of the screw being enclosed in the pocket 36 so that when a wrench is applied to the squared end 37 of the screw 35, the screw may be rotated to move the block 34 up and rotate the outer ends of the levers 30 downwardly to exert the necessary pressure on the hydraulic liquid to cause the tube to expand and the segment 23 to move outwardly. 38 is the usual cover for the pocket 9 in the journal box.

The use and operation of my invention are as follows:

The hydraulic expansible tube is first inserted in the reinforcing expanding metal ring. The expanding segment is placed in the ring in engagement with the exposed portion of the tube. The tube will of course be completely filled with hydraulic fluid. The annular, externally threaded nuts will be put in place, the plungers will penetrate the nuts, will be assembled with the pressure applying levers and the levers will be held in such position that no hydraulic pressure is applied to the hydraulic tube or expanding bulb, because in a sense that is just what it is.

Then the flexible rubber-like ring will be inserted in the reinforcing ring and the entire assembly will be dropped into the slot between the two end walls of the journal box. This seal assembly may easily be placed in the slot or pocket because in its retracted position, it does not make a tight fit with the walls of the journal box. Thereafter, the axle and journal are assembled with the box. The axle is inserted into the box from the rear open end, the journal penetrating first and normally not contacting the sealing ring. Further movement will bring the larger diameter of the axle into engagement with the ring and then the brasses and the wedge may be associated with the journal just as is shown in Figure 2. Journals are of different size. Axles are of different size. There may be variation in the size of the brass and the wedge. In other words, the exact position of the center of rotation or axis of the axle may vary from box to box and from time to time but since the flexible expansible sealing ring is free to move in the journal box and since it snugly encircles the axle, movement of the axle as it reaches its final normal working position will take with it the sealing ring. The sealing ring with the axle at rest will assume a position, the flanges 11 and 12 being generally equally stressed which is the normal position of the sealing ring as assembled with the axle at rest.

Thereafter pressure will be applied simultaneously to the two plungers 28 expanding the tube 27, pushing the follower segment 23 out, expanding the whole sealing assembly at a point outside the periphery of the axle to cause the sealing assembly to snugly and firmly grip the journal box. Because the movement of the member 23 is parallel with the axis of the journal, this expanding of the sealing ring can take place and the sealing ring may be locked in position without any change and without any variation in the relation between it and the axle. Thereafter, of course, once the outer periphery of the sealing ring is assembled in position, movement of the axle up and down or even sidewise can take place so far as the sealing ring is concerned without any loss of contact between the flanges 11 and 12 and the axle. The web between the portions 15, 16 and 17 where the outer periphery of the ring is locked in place will be free to yield to permit movement of the flanges 11 and 12 with the axle.

As shown the judgment of the operator is relied upon to decide how much pressure ought to be applied. He may give too much, he may not give enough but this is a simple solution of the problem.

The importance of a seal such as this is that it makes it possible, without loss of liquid lubricant, to lubricate the journal by a body of liquid as contrasted with lubrication by a mass of waste or porous material saturated with lubricant. If lubricant is free in the journal box, it can splash and while it is easy to close the outer end of the journal box against escape, it is essential that the inner end through which the axle extends be also sealed against lubricant escape. Such a seal as this which hugs the journal no matter what its position at its inner periphery and which is firmly and snugly seated in the journal box against movement at its outer periphery accomplishes this sealing purpose. Of course, incidentally it also prevents entrance of foreign matter into the journal box. However, temperatures change with resultant expansion and contraction of the air in the journal box and it is necessary that the box be able to breathe. The slots 57 through the web are so narrow that lubricant will not escape and dust will ordinarily not penetrate but changes in pressure inside or outside of the journal box may be compensated for because such change in pressure will cause air flow in one direction or the other through the slots into or out of the journal box.

While I have illustrated my invention in form best adapted to the use of hydraulic pressure to expand the sealing gasket, it will be obvious that pneumatic pressure might be used or that mechanical wedging means might also be used to accomplish the lateral expansion. I want it understood that my invention is not limited to the use of hydraulic means alone.

The lips 11 and 12 are exceedingly important. The lip 12 on the inner side of the box effectively prevents escape of lubricant and the lip 11 pointed in the opposite direction effectively prevents entrance of foreign matter into the box. One lip alone will not accomplish this. If the lip 11 were dispensed with then foreign matter could wedge its way into the angular space between the lip 12 and the journal. On the other hand, if the lip 12 were dispensed with, then while dirt would be kept out, oil or lubricant could wedge its way through the tapered space between the lip 11 and the journal.

It is also important to note that the entire width of the lip is within the area between the walls 7 and 8. If either lip were in position to be caught between the axle and the wall 7 or the wall 8 upon excessive movement of the axle, the lip would be cut and its usefulness destroyed. The ribs 18 and 19 thus are of the utmost importance because while they permit movement of the lips with respect to the remainder of the sealing ring in a plane perpendicular to the axle, they effectively prevent lateral movement in a direction parallel with the axis of the axle.

The metallic reinforcement 21 effectively prevents any squeezing or contracting of the rubber ring 20 upon the axle as a result of the expanding pressure. If a rubber element were to be substituted for the metallic element 21, then it would be necessary to have additional reinforcing means around the rubber sealing ring to protect it against any deformation which might result from the application of the pressure tending to expand the ring laterally and lock it in its place in the journal box.

While I have shown in Figure 1 horizontal ribs 18 on the underside of the sealing ring and radial ribs 19 on the upper side, it will be obvious that if desired horizontal ribs like 18 might be substituted for the ribs 19, the only difference being that when the journal moves vertically, the ribs 18 are loaded in shear and the ribs 19 tend to be loaded in compression or expansion. If those ribs also were horizontal they would also be loaded in shear but the effect would be substantially the same except that in some circumstances horizontal ribs above and below might permit easier movement of the ring to follow up and down movement of the axle.

I claim:

1. A seal for the inboard end of railroad journal boxes and the like including an elastomeric, centrally apertured sealing ring having a flange encircling and adapted to engage a railroad axle projecting through the aperture, a flange radially spaced from the axle engaging flange and encircling it, reinforcing ribs extending laterally from the ring and integral with the two flanges, the axle engaging flange being notched radially between the ribs for easy expansion of the flange to conform to axles of different diameters, the notches being located in the outer periphery of the axle engaging flange and extending through a portion only of the radial thickness of the flange.

2. A seal for the inboard end of railroad journal boxes and the like including an elastomeric, centrally apertured sealing ring having a flange encircling and adapted to engage a railroad axle projecting through the aperture, a flange radially spaced from the axle engaging flange and encircling it, reinforcing ribs extending laterally from the ring and integral with the two flanges, the ribs in the area on one side of the diametral axial plane of the ring being radial, the ribs on the other side of the diametral plane being parallel to said diametral plane.

References Cited in the file of this patent

UNITED STATES PATENTS

| | | |
|---|---|---|
| 568,476 | Falkner | Sept. 29, 1896 |
| 632,442 | Byle et al. | Sept. 5, 1899 |
| 905,356 | Peckham | Dec. 1, 1908 |
| 1,427,099 | Friedman et al. | Aug. 29, 1922 |
| 1,633,121 | Minton | June 21, 1927 |
| 1,740,929 | Loock | Dec. 24, 1929 |
| 2,071,736 | Farmer | Feb. 23, 1937 |
| 2,072,693 | Volkert | Mar. 2, 1937 |
| 2,114,241 | Tosten | Apr. 12, 1938 |
| 2,264,062 | Wilder | Nov. 25, 1941 |
| 2,465,175 | Schwarz et al. | Mar. 22, 1949 |
| 2,480,116 | Brummer | Aug. 30, 1949 |
| 2,565,190 | Winkeljohn | Aug. 21, 1951 |
| 2,657,080 | Johnson et al. | Oct. 27, 1953 |

FOREIGN PATENTS

| | | |
|---|---|---|
| 25,629 | Germany | Jan. 29, 1884 |
| 502,115 | Great Britain | Mar. 13, 1939 |